United States Patent
Ovshinsky et al.

(10) Patent No.: US 7,029,600 B2
(45) Date of Patent: Apr. 18, 2006

(54) HIGH CAPACITY HYDROGEN STORAGE MATERIAL BASED ON CATALYZED ALANATES

(75) Inventors: Stanford R. Ovshinsky, Bloomfield Hills, MI (US); Boyko Aladjov, Rochester Hills, MI (US); Srinivasan Venkatesan, Southfield, MI (US); Meera Vijan, West Bloomfield, MI (US); Subhash K. Dhar, Bloomfield, MI (US)

(73) Assignee: Ovonic Fuel Cell LLC, Rochester Hills, MI (US)

( * ) Notice: Subject to any disclaimer, the term of this patent is extended or adjusted under 35 U.S.C. 154(b) by 256 days.

(21) Appl. No.: 10/659,553

(22) Filed: Sep. 10, 2003

(65) Prior Publication Data

US 2005/0054525 A1    Mar. 10, 2005

(51) Int. Cl.
*C01B 6/06*    (2006.01)
*C01B 3/04*    (2006.01)

(52) U.S. Cl. ............... 252/188.27; 252/188.25; 423/644; 423/648.1; 423/658.2

(58) Field of Classification Search ........... 252/188.26, 252/188.27, 188.25; 420/528; 423/645–647, 423/658.2, 644, 648.1
See application file for complete search history.

(56) References Cited

OTHER PUBLICATIONS

Balema et al., "Titanium catalyzed solid-state transformation in LiAlH4 during high-energy ball-milling," Journal of Alloys and compounds, V. 313, pp. 108-114, (2001).*

* cited by examiner

*Primary Examiner*—Wayne A. Langel
(74) *Attorney, Agent, or Firm*—Frederick W. Mau, II; Marvin S. Siskind

(57) ABSTRACT

A complex aluminum hydride doped with a catalytic material adapted to increase the kinetics of hydrogen absorption/desorption of the aluminum hydride without reducing the hydrogen storage capacity of the aluminum hydride.

10 Claims, 1 Drawing Sheet

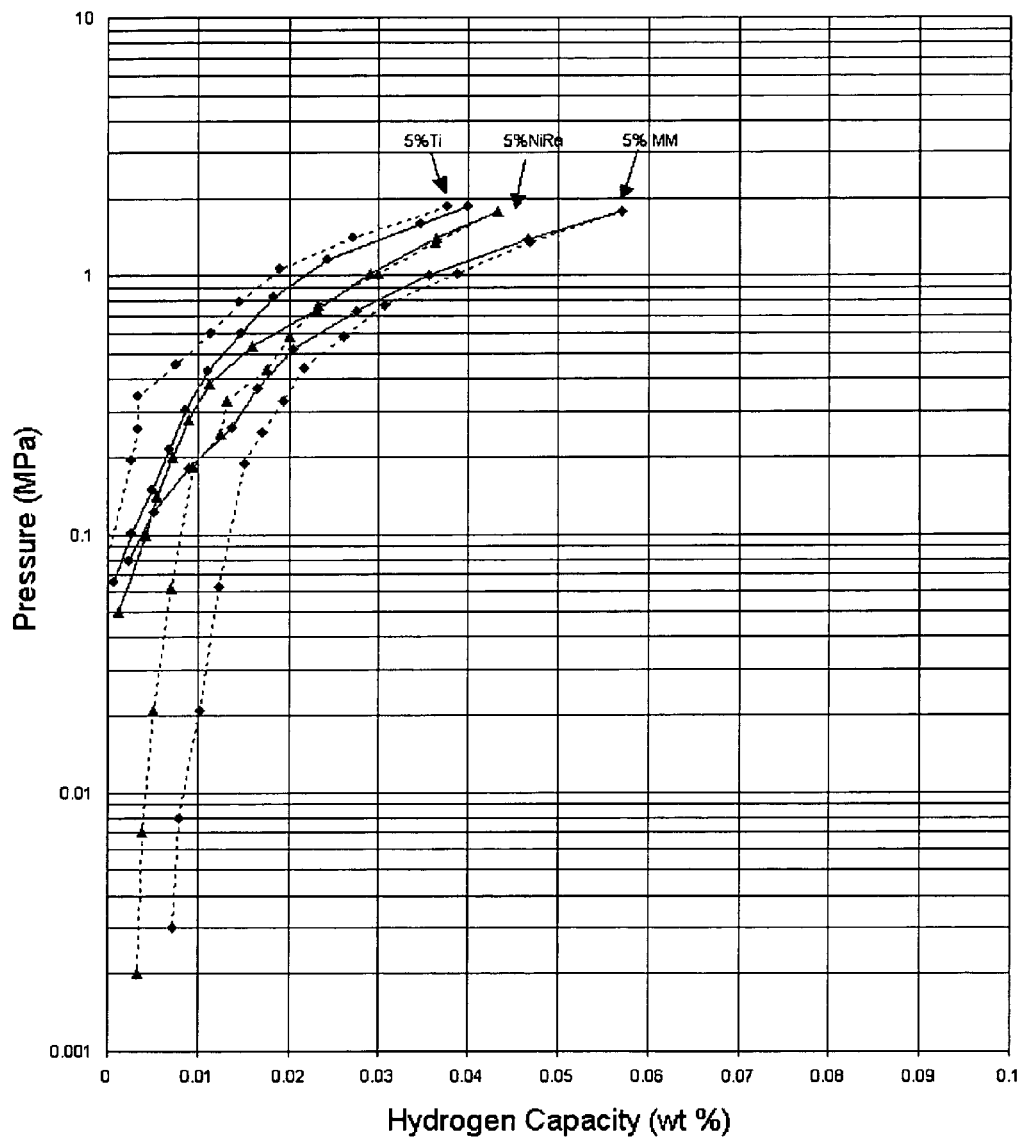

HIGH CAPACITY HYDROGEN STORAGE MATERIAL BASED ON CATALYZED ALANATES

FIELD OF THE INVENTION

The present invention generally relates to reversible hydrogen storage materials. More particularly, the present invention relates to alanates including a catalytic material which enhances the solid state hydrogen storage capabilities of these materials.

BACKGROUND

In the past, considerable attention has been given to the use of hydrogen as a fuel or fuel supplement. While the world's oil reserves are being rapidly depleted, the supply of hydrogen remains virtually unlimited. Hydrogen can be produced from coal, natural gas and other hydrocarbons, or formed by the electrolysis of water. Moreover hydrogen can be produced without the use of fossil fuels, such as by the electrolysis of water using nuclear or solar energy. Furthermore, hydrogen, although presently more expensive than petroleum, is a relatively low cost fuel. Hydrogen has the highest density of energy per unit weight of any chemical fuel and is essentially non-polluting since the main byproduct of burning hydrogen is water.

While hydrogen has wide potential as a fuel, a major drawback in its utilization, especially in mobile uses such as the powering of vehicles, has been the lack of acceptable lightweight hydrogen storage medium. Conventionally, hydrogen has been stored in a pressure-resistant vessel under a high pressure or stored as a cryogenic liquid, being cooled to an extremely low temperature. Storage of hydrogen as a compressed gas involves the use of large and heavy vessels. In a steel vessel or tank of common design only about 1% of the total weight is comprised of hydrogen gas when it is stored in the tank at a typical pressure of 136 atmospheres. In order to obtain equivalent amounts of energy, a container of hydrogen gas would weigh about thirty times the weight of a container of gasoline. Additionally, transfer of a large sized vessel is very difficult. Furthermore, storage as a liquid presents a serious safety problem when used as a fuel for motor vehicles since hydrogen is extremely flammable. Liquid hydrogen also must be kept extremely cold, below $-253°$ C., and is highly volatile if spilled. Moreover, liquid hydrogen is expensive to produce and the energy necessary for the liquefaction process is a major fraction of the energy that can be generated by burning the hydrogen.

Certain materials and alloys in solid state have the ability to absorb and desorb hydrogen. In this regard, they have been considered as a possible form of hydrogen-storage, due to their large hydrogen-storage capacity. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Solid-phase storage of hydrogen in a metal or alloy system works by absorbing hydrogen through the formation of a metal hydride under a specific temperature/pressure or electrochemical conditions, and releasing hydrogen by changing these conditions. Metal hydride systems have the advantage of high-density hydrogen-storage for long periods of time, since they are formed by the insertion of hydrogen atoms into the crystal lattice of a metal, alloy, or phase of the alloy. A desirable hydrogen storage material must have a high storage capacity relative to the weight of the material, a suitable desorption temperature/pressure, good absorption/desorption kinetics, good reversibility, no hysteresis, possess resistance to poisoning by contaminants including those present in the hydrogen gas, and be of a relatively low cost. If the material fails to possess any one of these characteristics it will not be acceptable for wide scale commercial utilization.

The hydrogen storage capacity per unit weight of material is an important consideration in many applications, particularly where the hydride does not remain stationary. In automotive applications, a material having a low hydrogen storage capacity relative to the weight of the material reduces the mileage, and hence the range of a hydrogen fueled vehicle utilizing such materials. A low hydrogen desorption temperature is desirable to reduce the amount of energy required to release the hydrogen from the material, as spending a great deal of energy to desorb hydrogen reduces the efficiency of the system. Furthermore, materials having a relatively low hydrogen desorption temperature are necessary for efficient utilization of the available exhaust heat from vehicles, machinery, fuel cells, or other similar equipment.

Good reversibility is needed to enable the hydrogen storage material to be capable of repeated absorption-desorption cycles without significant loss of its hydrogen storage capabilities. Good absorption/desorption kinetics are necessary to enable hydrogen to be absorbed or desorbed in a relatively short period of time. Resistance to contaminants, which the material may be subjected to during manufacturing and utilization, is required to prevent a degradation of acceptable performance. For example, magnesium hydrides have relatively high hydrogen storage capacities (up to 7.6 weight percent). However, te kinetics of the magnesium hydrides are poor in that only less than 1.0 weight percent is capable of desorption from the hydride at room temperature. Even at higher temperatures it is difficult to desorb all of the hydrogen stored in hydride form. Therefore, it is necessary to find a material or family of materials that will store more hydrogen with good reversibility and improved absorption/desorption kinetics.

A family of complex aluminum hydrides such as $Na(AlH_4)$, $Li(AlH_4)$, $Zr(AlH_4)$ and $Mg(AlH_4)$ have good theoretical reversible capacities between 4 weight percent and 8 weight percent as illustrated in Table 1 below. This family of complex aluminum hydrides are generally referred to as Alanates.

TABLE 1

|  | Theoretical Reversible Capacity |
| --- | --- |
| $Na(AlH_4)$ | 5.6 weight percent |
| $Li(AlH_4)$ | 7.9 weight percent |
| $Zr(AlH_4)$ | 3.9 weight percent |
| $MG(AlH_4)$ | 7.0 weight percent |

A reaction for the release of hydrogen from sodium alanate is as follows:

$$NaAlH_4 <-> \tfrac{1}{3}Na_3AlH_6 + \tfrac{2}{3}Al + H_2 <-> NaH + Al + \tfrac{3}{2}H_2$$

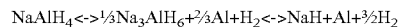

In practice, the reversibility of the alanates could not be achieved until recently when it was found that the addition of a small amount of titanium catalyst made them reversible under certain conditions. However, doping with Ti has reduced the hydrogen storage capacities from 5.6 weight percent to 4 weight percent. While having low hydrogen storage capacities, titanium doped alanates offer good equilibrium thermodynamics and also very good packing densities with moderate volume expansion.

The process of introducing Ti catalyst may also be very complex. One process for doping sodium alanate with titanium is based on the removal of some of the sodium from the sodium alanate by reacting it with $TiCl_3$. The titanium trichloride reacts with sodium to form sodium chloride under some strictly controlled conditions and in the process Ti catalyst is believed to enter the lattice. Although reversibility may now be promoted in alanates via the introduction of a titanium catalyst, the hydrogen storage capacity of the alanates are adversely affected and the process of including the titanium catalyst may be very complex.

Hydrogen storage is a technology critical to a wide variety of applications, some of the most prevalent being fuel cells, portable power generation, and hydrogen combustion engines. Such applications would benefit substantially from hydrogen storage materials capable of absorbing and desorbing higher amounts of hydrogen as compared to present day commercially available hydrogen storage materials. Hydrogen storage materials having increased absorption and desorption characteristics as compared to present day hydrogen storage materials will benefit such applications by providing longer operating life and/or range on a single charge for hydrogen power generators, fuel cells, and hydrogen internal combustion engines.

SUMMARY OF THE INVENTION

The present invention discloses a reversible hydrogen storage material comprising 80 to 99.9 weight percent of an alanate material, and 0.1 to 20 weight percent of a catalytic material adapted to increase the kinetics of hydrogen absorption/desorption of the alanate material without significantly reducing the hydrogen storage capacity of the alanate material. The alanate material has the formula $X(AlH_4)$, wherein X is an element chosen from Group IA alkali metals, Group IIA alkali earth metals, Group IIIB lanthanides, or Group IVB transition metals. Preferably, X is Na, Li, Zr, or Mg. The catalytic material may be a hydrogen storage alloy, a Raney catalytic material, or combinations thereof. The hydrogen storage alloy may be selected from rare-earth/Misch metal alloys, zirconium alloys, titanium alloys, magnesium alloys, or combinations thereof. The Raney catalytic material may be selected from Raney nickel, Raney iron, Raney Cobalt, Raney Manganese, or combinations thereof.

The present invention also discloses a method of making a reversible hydrogen storage material comprising the steps of 1) preparing a powder mixture comprising 80 to 99.9 weight percent of an alanate material and 0.1 to 20 weight percent of a catalytic material adapted to provide the alanate material with reversible hydrogen storage while not reducing the hydrogen storage capacity of the alanate material, and 2) mechanically milling the mixture in an inert atmosphere. The alanate material has the formula $X(AlH_4)$, wherein X is an element chosen from Group IA alkali metals, Group IIA alkali earth metals, Group IIIB lanthanides, or Group IVB transition metals. Preferably, X is Na, Li, Zr, or Mg. The catalytic material may be a hydrogen storage alloy, a Raney catalytic material, or combinations thereof. The hydrogen storage alloy may be selected from rare-earth/Misch metal alloys, zirconium alloys, titanium alloys, magnesium alloys, or combinations thereof. Many of these materials may be prepared and used as Raney alloys. The Raney catalytic material may be selected from Raney nickel, Raney iron, Raney Cobalt, Raney Manganese, or combinations thereof.

BRIEF DESCRIPTION OF THE DRAWINGS

The FIGURE is a PCT diagram showing the hydrogen absorption and desorption properties of hydrogen storage materials in accordance with the present invention.

DETAILED DESCRIPTION OF THE PREFERRED EMBODIMENTS OF THE INVENTION

The present invention discloses a high capacity reversible hydrogen storage material. The hydrogen storage materials in accordance with the present invention are capable of reversibly storing up to 8 weight percent hydrogen. These hydrogen storage materials are capable of providing a longer operating life and/or range on a single charge for hydrogen power generators, fuel cells, hydrogen internal combustion engines, and many other hydrogen powered applications. In addition, the present invention offers a much better way of introducing the catalyst to the alanates.

The hydrogen storage material may be generally comprised of 80 to 99.9 weight percent of an alanate material and 20 to 0.1 weight percent of a catalytic material. The alanate material has the general formula $X(AlH_4)$, wherein X is selected wherein X is an element selected from Group IA alkali metals, Group IIA alkali earth metals, Group IIIB lanthanides, or Group IVB transition metals. Preferably X is selected from Na, Li, Zr, or Mg.

The catalytic material may be a Raney catalytic material or a hydrogen storage alloy. The Raney catalytic material may be Raney nickel, Raney iron, Raney Cobalt, Raney Manganese, or combinations thereof. The hydrogen storage alloy may be Rare-earth metal alloys, Misch metal alloys, zirconium alloys, titanium alloys, magnesium/nickel alloys, and mixtures or alloys thereof which may be AB, $AB_2$, or $AB_5$ type alloys capable of storing hydrogen in metal hydride form. While not wishing to be bound by theory, it is believed that during hydrogen absorption the Raney catalytic material and the hydrogen storage alloy act to catalyze the dissociation of molecular hydrogen into atomic hydrogen thereby allowing the hydrogen to be easily absorbed into the alanate material and during hydrogen desorption the catalytic material aids in recombining atomic hydrogen to form molecular hydrogen. The hydrogen storage alloy also provides the benefit of increased reversible hydrogen storage capacity due to the reversibility and hydrogen storage capacity of the hydrogen storage alloy.

The hydrogen storage materials in accordance with the present invention may be prepared by mechanical milling of the alanates in an inert atmosphere with the catalytic material. Preferably, the mixture is milled in a ball mill for 30 minutes to an hour. The length of time and preparation conditions may vary with the type of mechanical milling. The milling takes place in an inert atmosphere to prevent oxidation of the hydrogen storage materials, which may be pyrophoric in the presence of oxygen. Any inert gas such as nitrogen, helium, or argon may be used to provide the inert atmosphere.

EXAMPLE

Samples of hydrogen storage materials in accordance with the present invention were prepared and tested for hydrogen storage capacities and kinetics of absorption and desorption at 30° C. The PCT measurements for the samples are shown in the FIGURE. The hydrogen storage materials were prepared by mechanically mixing 95 weight percent $Na(AlH_4)$ with 5 weight percent of a catalytic material. Samples were prepared using titanium (●), Raney nickel (▲), and misch metal (♦) as the catalytic material (absorption—solid line, desorption—dashed line). The materials including Raney nickel and misch metal demonstrated higher absorption capacities and higher reversible capacities as compared to the sample including titanium when all of the samples are prepared under the same conditions.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A reversible hydrogen storage material comprising:
   80 to 99.9 weight percent of an aluminum hydride; and
   0.1 to 20 weight percent of a catalytic material comprising a reversible hydrogen storage alloy, a Raney catalytic material, or combinations thereof, said catalytic material increasing the kinetics of hydrogen absorption/desorption of said aluminum hydride without significantly reducing the hydrogen storage capacity of said aluminum hydride.

2. The reversible hydrogen storage material according to claim 1, wherein said aluminum hydride has the formula $X(AlH_4)$, wherein X is an element selected from the group consisting of Group IA alkali metals, Group IIA alkali earth metals, Group IIIB lanthanides, and Group IVB transition metals.

3. The reversible hydrogen storage material according to claim 2, wherein X is Na, Li, Zr, or Mg.

4. The reversible hydrogen storage material according to claim 1, wherein said hydrogen storage alloy is selected from the group consisting of rare-earth/Misch metal alloys, zirconium alloys, titanium alloys, magnesium alloys, and combinations thereof.

5. The reversible hydrogen storage material according to claim 1, wherein said Raney catalytic material is selected from the group consisting of Raney nickel, Raney iron, Raney Cobalt, Raney Manganese, and combinations thereof.

6. A method of making a reversible hydrogen storage material comprising the steps of:
   preparing a powder mixture comprising 80 to 99.9 weight percent of an aluminum hydride and 0.1 to 20 weight percent of a catalytic material comprising a reversible hydrogen storage alloy, a Raney catalytic material, or combinations thereof, said catalytic material providing said aluminum hydride with reversible hydrogen storage while not reducing the hydrogen storage capacity of said aluminum hydride; and
   mechanically milling said mixture in an inert atmosphere.

7. The method according to claim 6, wherein said aluminum hydride has the formula $X(AlH_4)$, wherein X is an element selected from the group consisting of Group IA alkali metals, Group IIA alkali earth metals, Group IIIB lanthanides, and Group IVB transition metals.

8. The method according to claim 7, wherein X is Na, Li, Zr, or Mg.

9. The method according to claim 6, wherein said hydrogen storage alloy is selected from the group consisting of rare-earth/Misch metal alloys, zirconium alloys, titanium alloys, magnesium alloys, and combinations thereof.

10. The method according to claim 6, wherein said Raney catalytic material is selected from the group consisting of Raney nickel, Raney iron, Raney Cobalt, Raney Manganese, and combinations thereof.

* * * * *